(12) United States Patent
Tamse et al.

(10) Patent No.: US 11,343,495 B2
(45) Date of Patent: May 24, 2022

(54) METHODS OF SIMPLIFICATION OF TEMPORAL FILTERING

(71) Applicant: TENCENT AMERICA LLC, Palo Alto, CA (US)

(72) Inventors: Anish Mahendra Tamse, Seoul (KR); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/240,376

(22) Filed: Apr. 26, 2021

(65) Prior Publication Data

US 2021/0385444 A1    Dec. 9, 2021

Related U.S. Application Data

(60) Provisional application No. 63/034,042, filed on Jun. 3, 2020.

(51) Int. Cl.
| | |
|---|---|
| *H04N 19/17* | (2014.01) |
| *H04N 19/117* | (2014.01) |
| *H04N 19/172* | (2014.01) |
| *H04N 19/124* | (2014.01) |
| *H04N 19/31* | (2014.01) |
| *H04N 19/132* | (2014.01) |

(52) U.S. Cl.
CPC ......... *H04N 19/117* (2014.11); *H04N 19/124* (2014.11); *H04N 19/132* (2014.11); *H04N 19/172* (2014.11); *H04N 19/31* (2014.11)

(58) Field of Classification Search
None
See application file for complete search history.

(56) References Cited

U.S. PATENT DOCUMENTS

| | | | |
|---|---|---|---|
| 2007/0014362 A1 | 1/2007 | Cruz et al. | |
| 2010/0027665 A1 | 2/2010 | Pinhasov et al. | |
| 2010/0195901 A1 | 8/2010 | Andrus et al. | |
| 2011/0019082 A1* | 1/2011 | Su | G06T 5/004 |
| | | | 348/441 |

(Continued)

OTHER PUBLICATIONS

International Search Report dated Jul. 23, 2021 in International Application No. PCT/US2021/029603.

(Continued)

*Primary Examiner* — Stuart D Bennett
(74) *Attorney, Agent, or Firm* — Sughrue Mion, PLLC

(57) ABSTRACT

Systems and methods for implementing temporal filtering are provided. A method includes: applying a temporal filter to a current picture and encoding the current picture after the temporal filter is applied. The applying includes obtaining an exponential function, that includes an exponent with a numerator with at least one first factor and a denominator with at least one second factor, by computing the exponent of the exponential function as fixed-point values or by using at least one lookup table; obtaining a weight of at least one neighboring picture by multiplying a scaling function with the exponential function; obtaining a filtered sample value of the current picture based on a sample value of the current picture and the weight of the at least one neighboring picture; and replacing the sample value of the current picture with the filtered sample value.

20 Claims, 6 Drawing Sheets

(56) References Cited

U.S. PATENT DOCUMENTS

2011/0085084 A1* 4/2011 Jain .................. H04N 19/86
348/598
2020/0077090 A1 3/2020 Wennersten et al.

OTHER PUBLICATIONS

Written Opinion of the International Searching Authority dated Jul. 23, 2021 in International Application No. PCT/US2021/029603.
Hamida et al., "Spatio-temporal video filtering for video surveillance applications", IEEE International Conference on Multimedia and Expo Workshops, 2013 (9 pages total).
Kellman et al., "Adaptive sensitivity encoding incorporating temporal filtering (TSENSE)", Magnetic Resonance in Medicine, 2001, vol. 45, Issue 5, pp. 846-852 (8 pages total).

\* cited by examiner

METHODS OF SIMPLIFICATION OF TEMPORAL FILTERING

CROSS-REFERENCE TO RELATED APPLICATION

This application claims priority from U.S. Provisional Application No. 63/034,042, filed on Jun. 3, 2020, the disclosure of which is incorporated herein by reference in its entirety.

FIELD

Embodiments of the present disclosure relate to a set of advanced video coding technologies, and more particularly, implementations of temporal filtering.

BACKGROUND

AOMedia Video 1 (AV1) is an open, royalty-free video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors.

Libaom is the reference implementation of AV1. Scalable Video Technology AV1 (SVT-AV1) includes an open-source encoder and decoder first released by Intel in February 2019.

SUMMARY

Since a temporal filtering process may be performed only once per a block, as opposed to a multitude of coding modes and transform types tested during encoding, the total time taken for temporal filtering is a small fraction of the total encoding time. However when approaching a real-time encoder, most of the encoding modes are not tested or skipped using early decision process, whereas the temporal filtering continues to take roughly the same time as before which now becomes a major portion of the total time. Within the temporal filtering process, most of the time taken comes from the floating-point computation of a weight for a collocated pixel. The computation may also involve finding the value of the exponential function which is time consuming.

Since prior weight computation involves many floating-point computations, the hardware implementation of the encoder is quite expensive and inefficient.

Embodiments of the present disclosure may provide solutions to the above problems and/or other problems.

According to one or more embodiments, a method performed by an encoder is provided. The method includes: applying a temporal filter to a current picture, the applying including: obtaining an exponential function, that includes an exponent with a numerator with at least one first factor and a denominator with at least one second factor, by computing the exponent of the exponential function as fixed-point values or by using at least one lookup table; obtaining a weight of at least one neighboring picture by multiplying a scaling function with the exponential function; obtaining a filtered sample value of the current picture based on a sample value of the current picture and the weight of the at least one neighboring picture; and replacing the sample value of the current picture with the filtered sample value. The method further includes encoding the current picture after the temporal filter is applied.

According to an embodiment, the obtaining the exponential function includes the computing the exponent of the exponential function as the fixed-point values.

According to an embodiment, the computing the fixed-point values includes representing the fixed-point values as $2^n$ bits, wherein n is an integer.

According to an embodiment, the computing the fixed-point values includes scaling a floating-point value representation of a factor from among the at least one first factor or the at least one second factor with a scaling factor having a power of 2.

According to an embodiment, the obtaining the exponential function includes using the at least one lookup table.

According to an embodiment, the at least one lookup table includes a first lookup table and a second lookup table, and the first lookup table includes an integer part of the exponential function and the second lookup table includes a fractional part of the exponential function.

According to an embodiment, the at least one lookup table includes fixed-point values of the exponential function.

According to an embodiment, the method further includes converting factors of the scaling function to fixed-point representations, wherein the obtaining the weight of the at least one neighboring picture includes multiplying the fixed-point representations of the scaling function with the exponential function.

According to an embodiment, the method further includes performing a per-pixel loop for a plurality of iterations, each iteration of the plurality of iterations includes the obtaining the filtered sample value of the current picture, for a respective pixel from among pixels of the current picture; and converting, based on a factor from among the scaling function or the exponential function not varying for the pixels, to a fixed-point representation before performing the plurality of iterations of the per-pixel loop.

According to an embodiment, the at least one first factor of the numerator of the exponent includes motion estimation error of the at least one neighboring picture, the at least one second factor of the denominator of the exponent includes a quantization parameter, the scaling function includes a numerator with at least one third factor and a denominator with at least one fourth factor, the at least one third factor includes a noise level of the current picture, and the at least one fourth factor includes a picture order count distance of the at least one neighboring picture from the current picture.

According to one or more embodiments, a system is provided. The system includes: at least one memory storing computer code; and at least one processor configured to access the computer code and operate as instructed by the computer code, the computer code including temporal filter code that is configured to cause the at least one processor to apply a temporal filter to a current picture, the temporal filter code including: exponential function obtaining code that is configured to cause the at least one processor to obtain an exponential function, that includes an exponent with a numerator with at least one first factor and a denominator with at least one second factor, by computing the exponent of the exponential function as fixed-point values or by using at least one lookup table; weight obtaining code that is configured to cause the at least one processor to obtain a weight of at least one neighboring picture by multiplying a scaling function with the exponential function; filtered sample value obtaining code that is configured to cause the at least one processor to obtain a filtered sample value of the current picture based on a sample value of the current picture and the weight of the at least one neighboring picture; and sample value replacing code that is configured to cause the at least one processor to replace the sample value of the current picture with the filtered sample value. The computer code may further include encoding code that is configured to cause the at least one processor to encode the current picture after the temporal filter is applied.

According to an embodiment, the exponential function obtaining code is configured to cause the at least one processor to compute the exponent of the exponential function as the fixed-point values.

According to an embodiment, the exponential function obtaining code is configured to cause the at least one processor to represent the fixed-point values as $2^n$ bits, wherein n is an integer.

According to an embodiment, the exponential function obtaining code is configured to cause the at least one processor to scale a floating-point value representation of a factor from among the at least one first factor or the at least one second factor with a scaling factor having a power of 2.

According to an embodiment, the exponential function obtaining code is configured to cause the at least one processor to obtain the exponential function by using the at least one lookup table.

According to an embodiment, the at least one lookup table includes a first lookup table and a second lookup table, and the first lookup table includes an integer part of the exponential function and the second lookup table includes a fractional part of the exponential function.

According to an embodiment, the at least one lookup table includes fixed-point values of the exponential function.

According to an embodiment, the computer code further includes converting code configured to cause the at least one processor to convert factors of the scaling function to fixed-point representations, wherein the weight obtaining code is configured to cause the at least one processor to obtain the weight of the at least one neighboring picture by multiplying the fixed-point representations of the scaling function with the exponential function.

According to an embodiment, the computer code further includes: loop code that includes the filtered sample value obtaining code and that is configured to cause the at least one processor to perform a per-pixel loop for a plurality of iterations, each iteration of the plurality of iterations includes obtaining the filtered sample value of the current picture, for a respective pixel from among pixels of the current picture; and convening code that is configured to cause the at least one processor to convert, based on a factor from among the scaling function or the exponential function not varying for the pixels, to a fixed-point representation before the plurality of iterations of the per-pixel loop are performed.

According to one or more embodiments, a non-transitory computer-readable medium storing computer code is provided. The computer code is configured to, when executed by at least one processor, cause the at least one processor to apply a temporal filter to a current picture, by: obtaining an exponential function, that includes an exponent with a numerator with at least one first factor and a denominator with at least one second factor, by computing the exponent of the exponential function as fixed-point values or by using at least one lookup table; obtaining a weight of at least one neighboring picture by multiplying a scaling function with the exponential function; obtaining a filtered sample value of the current picture based on a sample value of the current picture and the weight of the at least one neighboring picture; and replacing the sample value of the current picture with the filtered sample value. The computer code may also be configured to cause the at least one processor to encode the current picture after the temporal filter is applied.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

In the present disclosure, the term block may mean a prediction block, a coding block, or a coding unit (CU).

Figure 1:
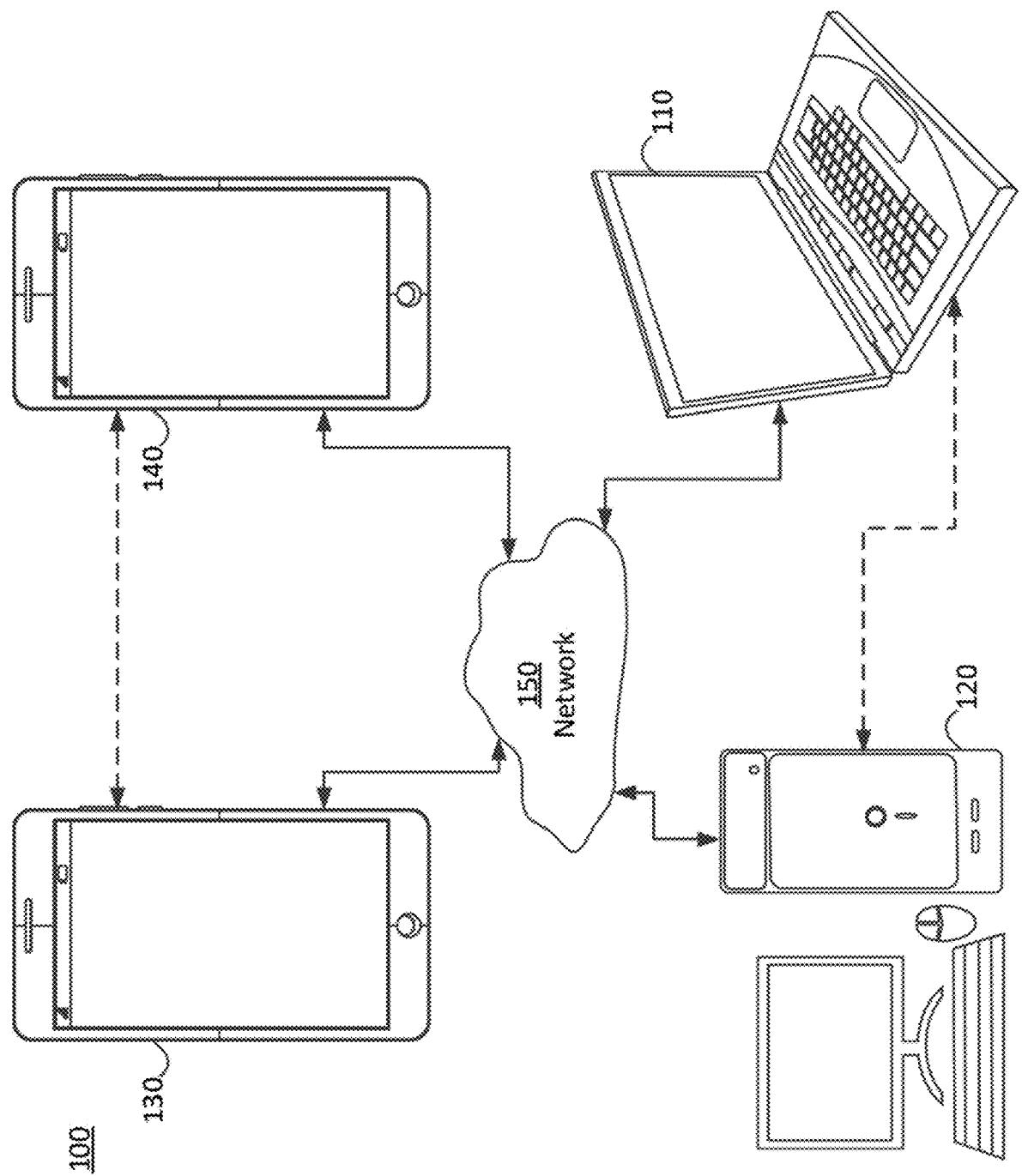
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
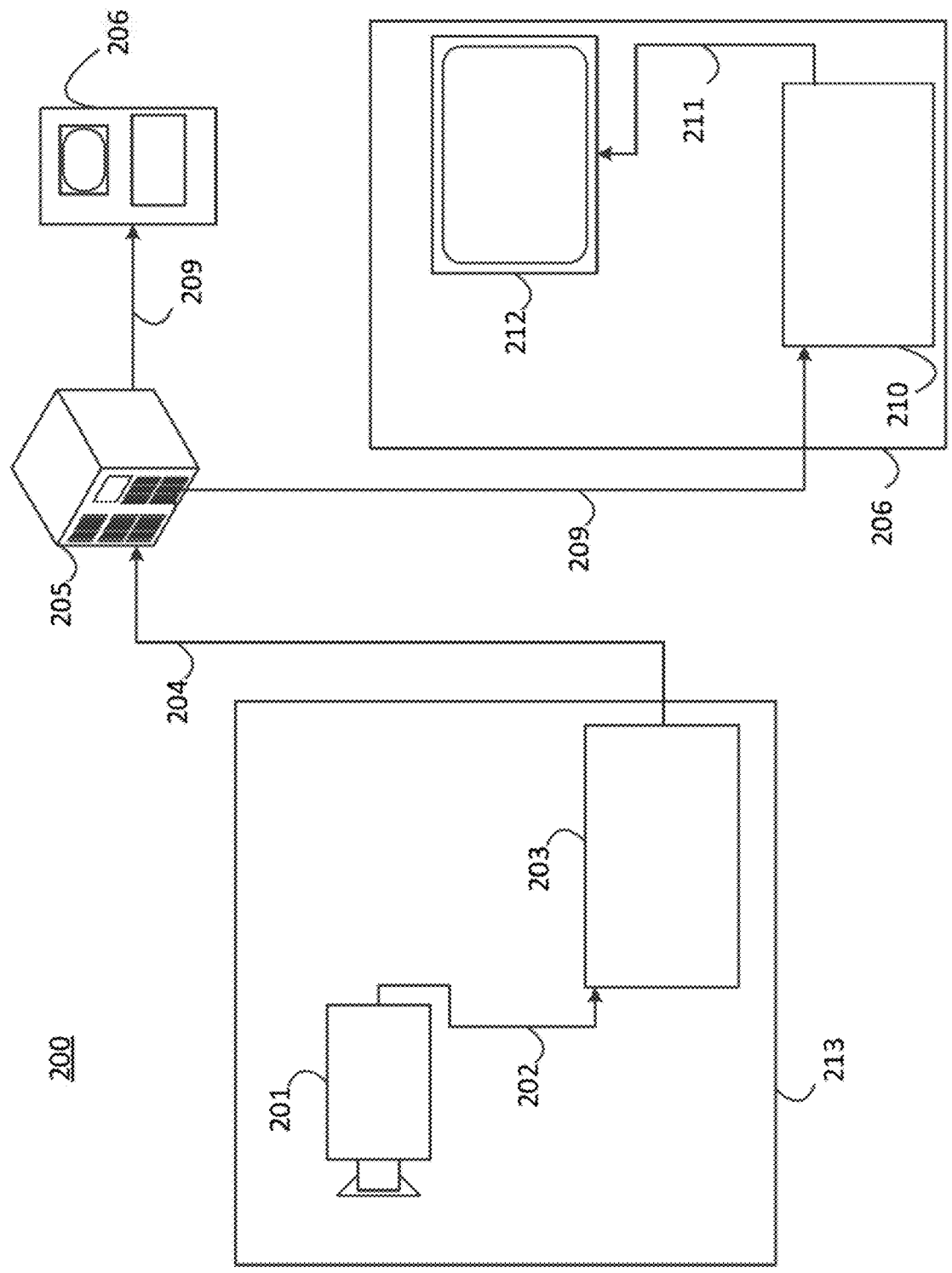
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
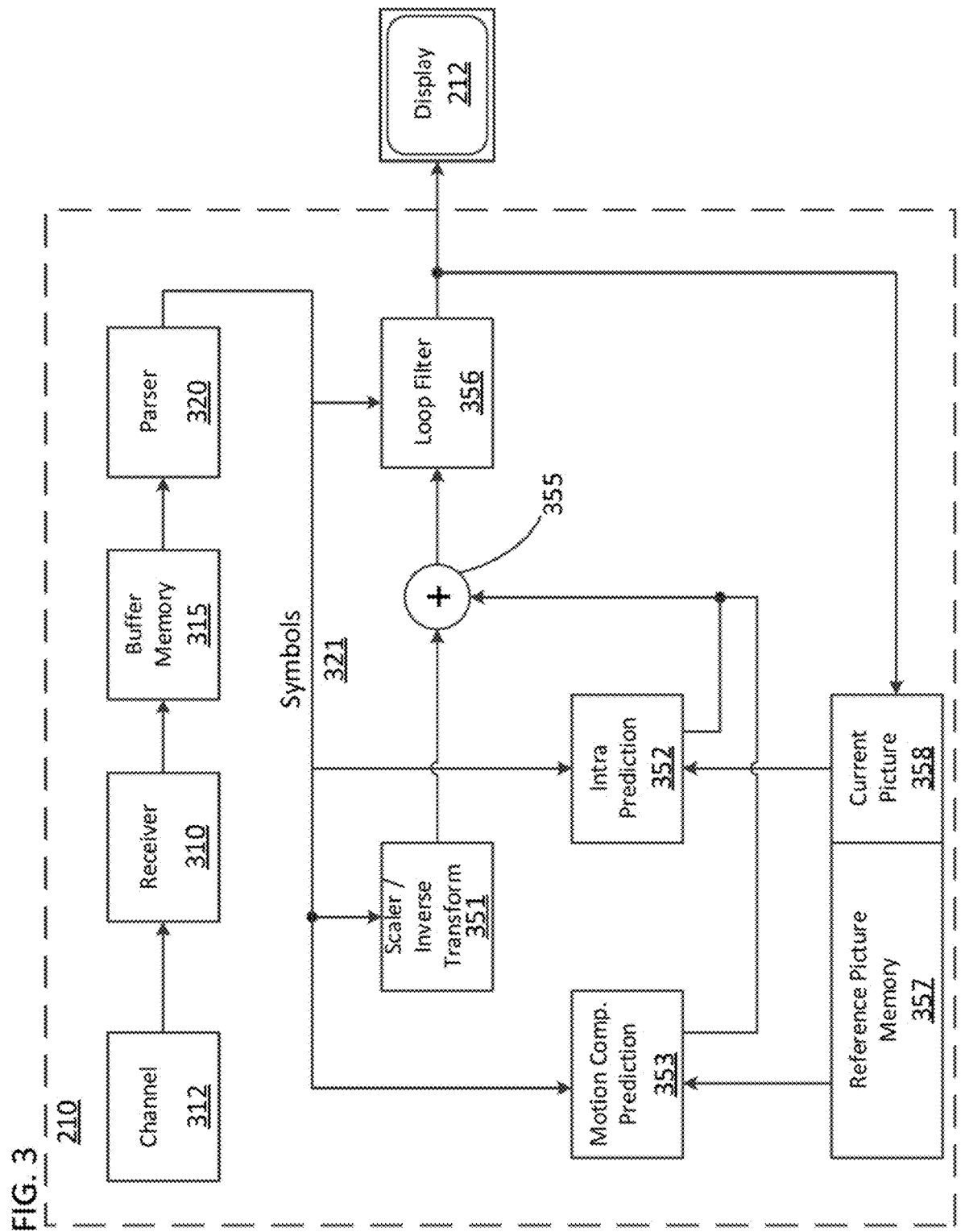
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320)("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks. Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop tilter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
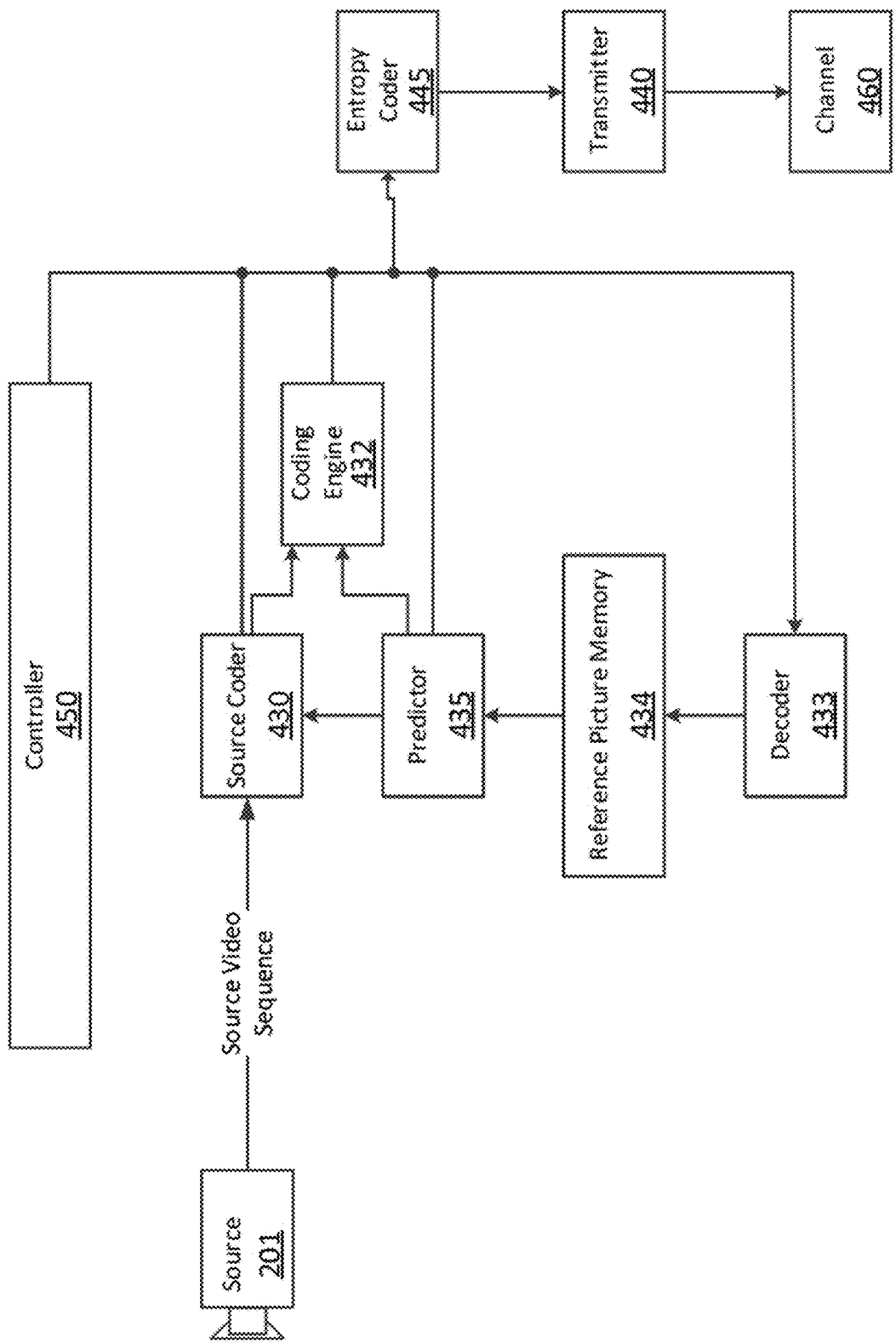
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not pan of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430)(responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on encoder operation. The description of the decoder technologies can be abbreviated as they may be the inverse of the comprehensively described encoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Temporal filtering is a technique which attempts to denoise a current frame using the temporal redundancy with neighboring frames. It is applied in Versatile Video Coding and Test Model 6 (VTM6) (as described in JVET-O0549) which is the test model for Versatile Video Coding (VVC) codec and in libaom and SVT-AV1 which are encoders for the AV1 codec. The precise implementation of the filter varies between encoders.

During mode decision, an encoder may try to minimize the rate*lambda+distortion metric for each block.

If a current picture is followed by an identical following picture, the coded blocks in the current picture may be skipped. In this case, rate*lambda+2*distortion may be minimized. VTM approximates this for Random-Access (RA) by setting different quantization parameter (QP) values for the temporal layers.

If the following picture is only slightly different, the coded block is still likely to be skipped. In this case, rate*lambda+distortion1+distortion2 may be minimized. Rather than calculating the two distortions separately, the distortion between the coded block and the average of the original versions of the two pictures can be calculated. This is one motivation for using temporally filtered original pictures. The filter strength may drop off rapidly if the original images are different, as it is no longer likely that the decoded sample values for the first picture will be re-used for the second picture.

The general application process of temporal filter in encoders may be as follows.

Step 1: A picture is read by the encoder.

Step 2: If the picture is low enough in the coding hierarchy, it is filtered before encoding. Otherwise the picture is encoded without filtering.

Step 3: If the temporal filter is determined to be applied to the current frame, a motion estimation and motion compensation method is applied on the neighboring pictures. An aim of this step is to find the closest match to the current block in each of the neighboring frames.

Step 4: Once all the similar blocks from each of the neighbouring frames are gathered, all the sample values of the original picture are replaced by the encoder by filtered sample values $I_n$ before encoding by using the following Equation (1):

$$I_n = \frac{I_o + \sum_{i=0}^{3} w_r(i, a) I_r(i)}{1 + \sum_{i=0}^{3} w_r(i, a)} \quad \text{Equation (1)}$$

$I_o$ is the original sample value, $I_r(i)$ is the co-located sample value in the neighboring picture i after motion compensation and $w_r(i,a)$ is the weight of neighboring picture i when the number of available neighboring pictures is equal to a.

The weights, $w_r(i,a)$, are calculated by the encoder by using the following Equation (2):

$$w_r(i, a) = s \cdot e^{-\frac{f(\Delta I(i)) \times x_n}{x_d}} \quad \text{Equation (2)}$$

e may be an exponential constant. $\Delta I(i)$ is calculated by using the following Equation (3):

$$\Delta I(i) = I_r(i) - I_o \quad \text{Equation (3)}$$

The function $f$ computes a factor in the exponent based on $\Delta I$, the exact function differs between implementations, $x_n$ and $x_d$ are other factors which modify the weight, which may depend on other pixel level characteristics like local mean ME error, or may depend on block/frame level characteristics like QP. Finally, s is the scaling factor for the final weight computation.

Although temporal filter implementations may be performed as described above, the specifics of the implementations may vary. The implementations vary mainly in the following points:

(A) Applicable Frames: Although implementations may apply temporal filtering to the lower layers in the Group of Pictures (GOP) hierarchy, there is minor variations in the way it is determined. For example, in VTM, Random-Access (RA) pictures with picture order count (POC) % 8==0 and Low-Delay (LD) pictures with POC % 4=0 are filtered. All-Intra (AI) pictures are never filtered. Also, in Libaom and SVT-AV1, all KEYFRAMES and ALTREF frames are temporally filtered.

(B) Number of reference frames: The number of neighboring frames used for the temporal filtering process may vary from encoder to encoder. VTM may use 4 frames under RA coding condition and 2 reference frames under LD coding configuration. The libaom and SVT encoders have the number of reference frames configurable. The default value may however be set to 7 reference frames.

(C) Sizes of blocks used: VTM may perform the motion estimation (ME), motion compensation (MC) and filtering process on an 8×8 block basis whereas libaom and SVT may perform the process on a 32×32 block basis. Libaom and SVT may both switch to 16×16 level processing if the decoder detects the ME error is too large.

(D) Motion estimation: The implementations may differ in the aspects of the number of hierarchical motion estimation levels, whether the search starts from the subsampled reference and current frames, the smallest fractional pixel to which the motion estimation is performed, and the filters used for motion compensation.

(E) Weight computation methods: The weight assigned to each of the collocated pixels prior to averaging is a main area where implementations may differ. The weight computation can be a made of a function of various factors. While the motion estimation error of the current pixel is a commonly used factor in implementations, many more factors can be used to vary the resulting weights. For example, in VVC, ME error and QP of the current frame may be used to determine the weight. In Libaom, ME error of a window around the current pixel, noise level of the current frame, and magnitude of the motion vector may be used to determine the weights. In SVT-AV1: ME error of a window around the current pixel and noise levels of the current frame may be used to determine the weights.

Despite the differences in the factors used, the implementations may make use of the following Equation (4) to determine the weight:

$$w_r(i, a) = s \cdot e^{-\frac{f(\Delta I(i)) \cdot x_n}{x_d}}$$ Equation (4)

The terms used in the equation are described earlier. Since at least one of the factors (e.g. ME error for the pixel/average ME error of a window around the current pixel) vary from pixel to pixel, the weight for each pixel is unique and may need to be computed repeatedly.

Embodiments of the present disclosure may be used separately or combined in any order. Further, each of the embodiments (e.g. methods, encoders, and decoders) may be implemented by processing circuitry (e.g., one or more processors or one or more integrated circuits). In one example, the one or more processors execute a program that is stored in a non-transitory computer-readable medium. Embodiments of the present disclosure may implement aspects of temporal filtering as described above and below.

Embodiments of the present disclosure may not only implement the techniques, described in the present disclosure, for temporal filtering, but also for any method which contains exponential calculation as described below.

Embodiments of the present disclosure may implement a weight derivation equation for calculating a weight w. A general form of the weight derivation equation for calculating the weight w is shown below in Equation (5), where e may be an exponential constant and $s_{n1}$, $s_{n2}$, $s_{d1}$, $s_{d2}$, $x_{n1}$, $x_{n2}$, $x_{d1}$, $x_{d2}$ are real numbers. According to embodiments, the number of factors may vary. For example, in an embodiment, only $s_{n1}$, $s_{d1}$, $x_{n1}$, $x_{d1}$ are included in the equation. In another embodiment, $s_{n1}$, $s_{n2}$, $s_{n3}$, $s_{d1}$, $s_{d2}$, $s_{d3}$, $x_{n1}$, $x_{n2}$, $x_{n3}$, $x_{d1}$, $x_{d2}$, $x_{d3}$ may be included in the equation.

$$w = \frac{s_{n1} s_{n2} \cdots}{s_{d1} s_{d2} \cdots} \cdot e^{-\frac{x_{n1} x_{n2} \cdots}{x_{d1} x_{d2} \cdots}}$$ Equation (5)

The reasons for having a general form in this fashion are as follows:

(A) The terms in the numerator of the exponent (e.g. $x_{n1}$, $x_{n2}$ . . . ) are the factors which decrease the final weight computed if they become larger. For example, one such factor could be the motion estimation error. If the motion estimation error is larger, the weight should be smaller and hence the motion estimation error related factor is placed in the numerator. There can be multiple such factors and hence there may be multiple factors in the numerator in the general form.

(B) The terms in the denominator of the exponent (e.g. $x_{d1}$, $x_{d2}$ . . . ) are the factors which increase the final weight computed if they become larger. For example, one such factor may be the quantization parameter (QP). If the quantization parameter (QP) is larger, the weight should be smaller and hence the QP factor related parameter is placed in the denominator. There can be multiple such factors and hence there may be multiple factors in the denominator in the general form.

(C) Terms $s_{n1}$, $s_{n2}$ . . . of a numerator can contain the final scaling factor. The final weight may be scaled since the exponential function can result in a value less than 1, and to operate in fixed point precision, scaling may need to be performed. The terms can also contain parameters which can linearly affect the final weight computed. For example, one parameter could be the noise level of the frame being filtered, wherein the larger the amount of noise, the weight may be increased proportionately. Since there can be multiple such parameters and since scaling factor is also included in the numerator, the general form may include multiple factors in the numerator.

(D) Terms $s_{d1}$, $s_{d2}$ . . . of a denominator can contain factors which may affect the final weight inversely. Such factor may include, for example, POC distance of the reference frame from the current frame. In such case, the greater the POC distance, a lower weight may be assigned to the reference frame. Since there can be multiple such parameters, the denominator may include multiple factors in the general form.

According to embodiments, an encoder may compute the exponent of the exponential function (e.g. the terms $x_{n1}$, $x_{n2}$ . . . and $x_{d1}$, $x_{d2}$ . . . ) as fixed-point values instead of floating-point values.

According to an embodiment, the fixed-point representation may be represented using 2n bits where n is a whole number. The value n may be chosen such that the fixed-point value does not overflow 2n.

In another embodiment, the fixed-point representation may use a scaling factor such that the underlying floating-point value may be obtained by division by the scaling factor. The scaling factor may further be chosen to be a power of 2 so that the scaling operations can be performed by simple binary logical shift operations. For example, the scaling factor may be equal to $2^5$, The floating point value xn1 may be written as a fixed point value by computing $x_{n1\_fixed} = x_{n1} \times 2^5$ and rounding it to the nearest integer. Multiplication of $x_{n2}$ with another integer $x_{n2}$ may be performed as $(x_{n1\_fixed} \times x_{n2}) >> 5$.

In one embodiment, the scaling factor may be chosen such that scaling up and back down to obtain the underlying floating-point value does not cause significant loss in accuracy of the value.

In another embodiment, the scaling factor may be chosen such that the scaling up operation of the floating point to obtain the fixed point representation and performing the computation in the said fixed point representation does not degrade the performance of the encoder significantly. For example, each of the factors used for computation of the exponent of the exponential function (for example, the average motion estimation error, noise level of the frame, and magnitude of the motion vector) themselves may be converted to a fixed point representation.

According to embodiments, an encoder may obtain the exponential function using a lookup table(s) instead of using the above-described computations.

According to an embodiment, the exponential function may be computed using two lookup tables, one for the fractional part and one for the integer part of the input value, since $e^{integer+fraction} \times e^{integer} \times e^{fraction}$.

In one embodiment, the lookup table(s) may contain fixed point values which are derived by scaling the floating-point values appropriately.

In one embodiment, $e^x$ may be equivalently converted to $2^{x \cdot \log 2e}$, which may further be written as $2^{integer} 2^{fraction}$. The $2^{fraction}$ part may be computed using a lookup table while the $2^{integer}$ part may be obtained using a logical shift operation.

In an embodiment the values stored in the lookup table may not be more than N-bit wide each, so that single instruction/multiple data (SIMD) implementation of the lookup operation may be performed efficiently. For example, N may be equal to 8, and SIMD lookup can be performed efficiently for Advanced Vector Extensions (AVX) and Advance Vector Extensions 2 (AVX2) instruction sets.

In an embodiment, the size of the lookup table may not be more than N values long so that SIMD implementation of the lookup operation may be performed efficiently. For example, N may be equal to 16, and SIMD lookup can be performed efficiently for AVX and AVX2 instruction sets.

According to embodiments, an encoder may convert the values $s_{n1}, s_{n2} \ldots$ and $s_{d1}, s_{d2}, \ldots$, which are multiplied/divided with the exponential function to obtain the final weight for a given collocated pixel, to a fixed point value prior to multiplication in order to avoid floating point mathematics. The point during the computation at which the values are converted can vary the final performance.

In an embodiment, the scaling factor used for conversion of floating-point value to fixed-point representation may be a power of 2 so that the scaling operations can be performed by simple binary logical shift operations.

In an embodiment the values $s_{n1}, s_{n2} \ldots$ and $s_{d1}, s_{d2} \ldots$ may be incorporated directly into the lookup table for the exponential function so that no further multiplication is required after looking up the value from the table. As an example, the incorporation into the lookup table can be performed by multiplying the factor $s_{n1}s_{n2} \ldots / s_{d1}s_{d2} \ldots$ to the existing values in the lookup table. In an example, the values in the lookup table may be converted to fixed point values after incorporating $n_{n1}, s_{n2} \ldots$ and $s_{d1}, s_{d2} \ldots$.

According to embodiments, an encoder may convert the non-varying values among $s_{n1}, s_{n2} \ldots$ and $s_{d1}, s_{d2} \ldots$ to fixed point after computing their effective value by multiplying/dividing them. This fixed-point value may be used directly during the weight computation for each pixel instead of converting to fixed point later during per pixel weight computation. The point during the computation at which the values are converted can vary the final performance. Converting the values to fixed point outside the per-pixel loop saves the redundant computation and is hence more efficient.

In an embodiment, the subset of factors in the exponent of the exponential ($x_{n1}, x_{n2} \ldots$ and $x_{d1}, x_{d2} \ldots$) which stay constant for a block of pixels, may be precomputed and their resultant value may be stored. When computing the weight per pixel, each of $x_{n1}, x_{n2} \ldots$ and $x_{d1}, x_{d2} \ldots$ may not be multiplied/divided, and only those which vary for each pixel may be multiplied/divided with the combined value of the non-varying factors.

In an embodiment, the scaling factor used for conversion of floating-point value to fixed-point representation may be a power of 2 so that the scaling operations can be performed by simple binary logical shift operations.

In an embodiment, the non-varying factors among $x_{n1}, x_{n2} \ldots$ and $x_{d1}, x_{d2} \ldots$ may be converted to fixed point after computing their effective value by multiplying/dividing them. This fixed-point value may be used directly during the weight computation for each pixel instead of converting to fixed point later during per pixel weight computation. The point during the computation at which the values are converted can vary the final performance. Converting the values to fixed point outside the per-pixel loop saves the redundant computation and is hence more efficient.

Embodiments of the present disclosure may comprise at least one processor and memory storing computer code. The computer code, when executed by the at least one processor, may be configured to cause the at least one processor to perform the functions of the embodiments of the present disclosure. An encoder (or a decoder) may include the at least one processor and the memory. The encoder (or the decoder) may perform the functions of the embodiments described herein.

Figure 5:
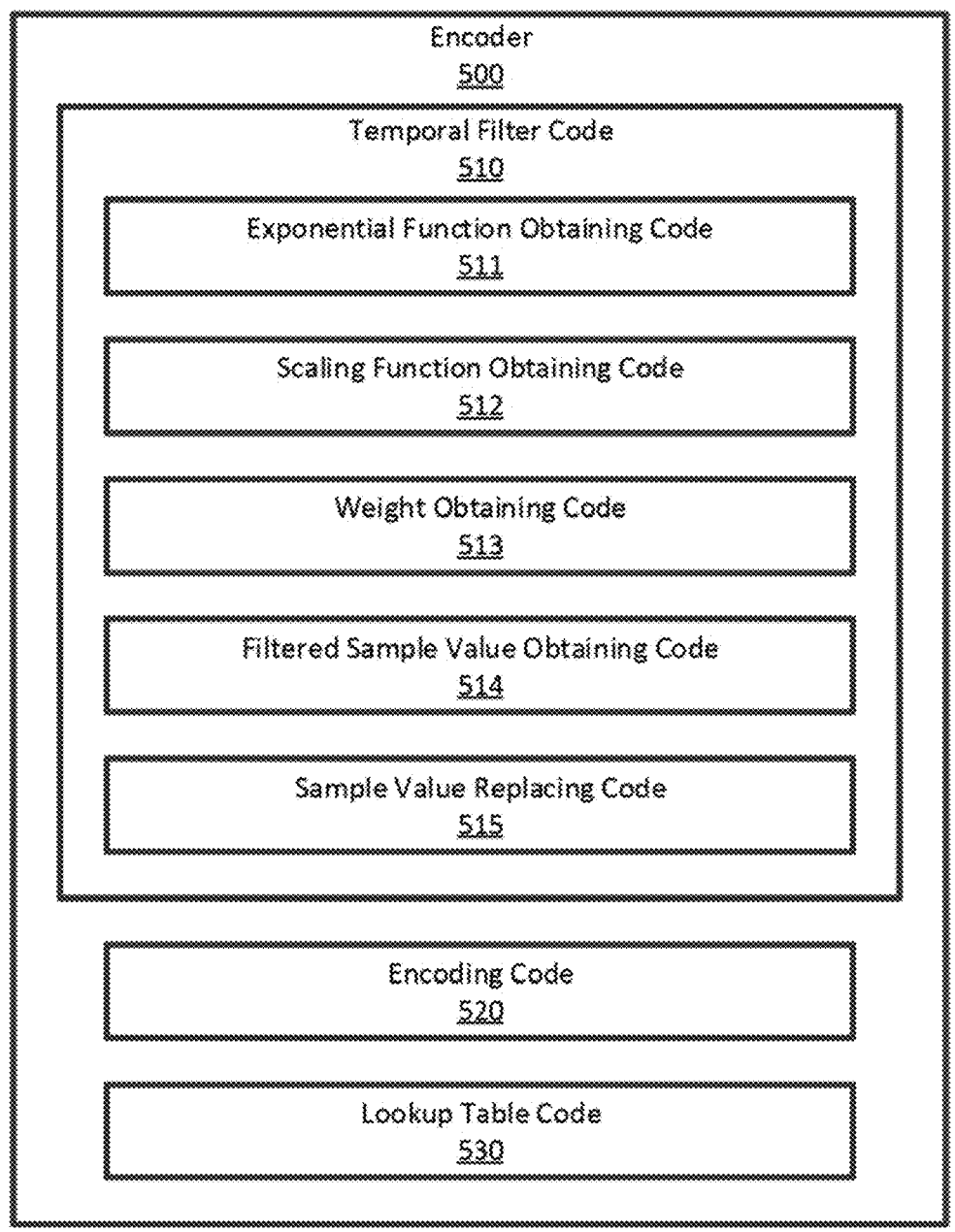
FIG. 5 is a diagram of computer code according to embodiments.

For example, with reference to FIG. 5, an encoder (500) of the present disclosure may comprise at least one processor and memory storing computer code. The computer instructions may comprise temporal filter code (510) and encoding code (520).

The temporal filter code (510) may be configured to cause the at least one processor to apply a temporal filter to a current picture, as described with respect to one or more embodiments of the present disclosure. As an example, the temporal filter code (510) may include exponential function obtaining code (511), scaling function obtaining code (512), weight obtaining code (513), filtered sample value obtaining code (514), and sample value replacing code (515).

The exponential function obtaining code (511) may be configured to cause the at least one processor to obtain an exponential function, that includes an exponent with a numerator with at least one first factor (e.g. $x_{n1}, x_{n2} \ldots$) and a denominator with at least one second factor (e.g. $x_{d1}, x_{d2} \ldots$), by computing the exponent of the exponential function as fixed-point values and/or by using at least one lookup table, as described with respect to one or more embodiments of the present disclosure.

The scaling function obtaining code (512) may be configured to cause the at least one processor to obtain a scaling function, that includes an exponent with a numerator with at least one third factor (e.g. $s_{n1}, s_{n2} \ldots$) and a denominator with at least one fourth factor (e.g. $s_{d1}, s_{d2} \ldots$), by computing the factors of the scaling function as fixed-point values and/or by using at least one lookup table, as described with respect to one or more embodiments of the present disclosure.

The weight obtaining code (513) may be configured to cause the at least one processor to obtain a weight of at least one neighboring picture by multiplying the scaling function with the exponential function (e.g. refer to Equation (5)), as described with respect to one or more embodiments of the present disclosure.

The filtered sample value obtaining code (514) may be configured to cause the at least one processor to obtain a filtered sample value of the current picture based on a sample value of the current picture and the weight of the at least one neighboring picture, as described with respect to one or more embodiments (e.g. refer to Equation (1)) of the present disclosure.

The sample value replacing code (515) may be configured to cause the at least one processor to replace the sample value of the current picture with the filtered sample value, as described with respect to one or more embodiments of the present disclosure.

According to embodiments, the temporal filter code (510) may include loop code that is configured to cause one or more of the exponential function obtaining code (511), the scaling function obtaining code (512), the weight obtaining code (513), the filtered sample value obtaining code (514), and the sample value replacing code (515) to be performed iteratively either wholly or partly, per each pixel from among pixels of the current picture. According to one or more embodiments, one or more of the exponential function obtaining code (511) and the scaling function obtaining code (512) may include converting code for converting values of the exponential function and/or the scaling function into fixed-point representations from floating-point representations, and which may be included inside or outside of the loop code.

The encoding code (520) may be configured to cause the at least one processor to encode the current picture after the temporal filter is applied, as described with respect to one or more embodiments of the present disclosure.

According to one or more embodiments, the computer code may further include lookup table code (530) which may be configured to cause the at least one processor to obtain one or more lookup tables as described with respect to embodiments of the present disclosure. For example, according to embodiments, the lookup table code (530) may be configured to cause the at least one processor to receive the lookup table(s) and/or construct the lookup table(s) including values therein.

The techniques of embodiments of the present disclosure described above, can be implemented as computer software using computer-readable instructions and physically stored in one or more computer-readable media. For example, FIG. 6 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
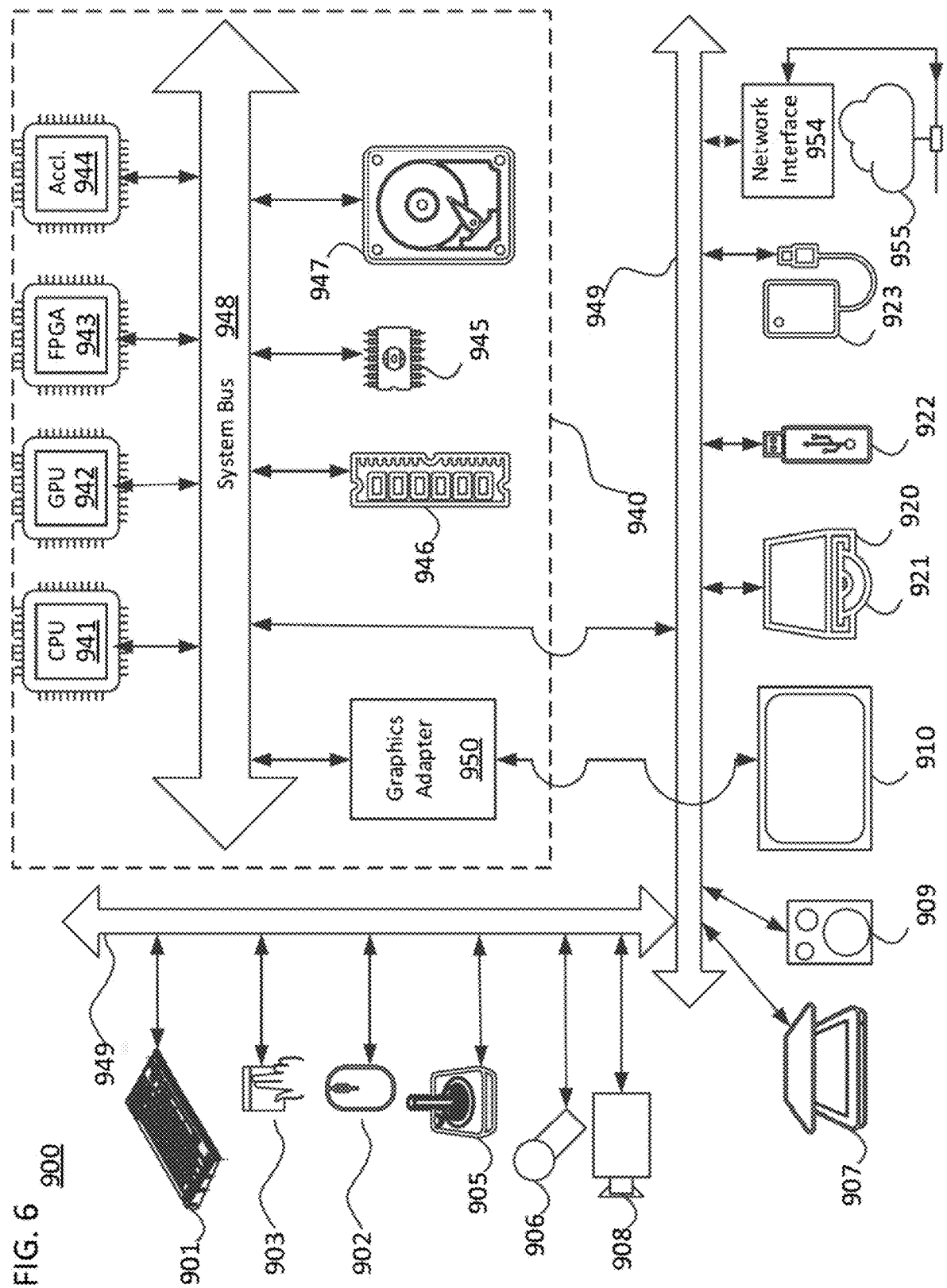
FIG. 6 is a diagram of a computer system suitable for implementing embodiments.

The components shown in FIG. 6 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949)(such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM)(945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945). RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by an encoder, the method comprising:
   applying a temporal filter to a current picture, the applying comprising:
      obtaining an exponential function, that includes an exponent with a numerator with at least one first factor and a denominator with at least one second factor, by computing the exponent of the exponential function as fixed-point values or by using at least one lookup table;
      obtaining a weight of at least one neighboring picture by multiplying a scaling function with the exponential function;
      obtaining a filtered sample value of the current picture based on a sample value of the current picture and the weight of the at least one neighboring picture; and
      replacing the sample value of the current picture with the filtered sample value; and
   encoding the current picture after the temporal filter is applied.

2. The method of claim 1, wherein the obtaining the exponential function comprises the computing the exponent of the exponential function as the fixed-point values.

3. The method of claim 2, wherein the computing the fixed-point values comprises representing the fixed-point values as $2^n$ bits, wherein n is an integer.

4. The method of claim 2, wherein the computing the fixed-point values comprises scaling a floating-point value representation of a factor from among the at least one first factor or the at least one second factor with a scaling factor having a power of 2.

5. The method of claim 1, wherein the obtaining the exponential function comprises using the at least one lookup table.

6. The method of claim 1, wherein
   the at least one lookup table comprises a first lookup table and a second lookup table, and
   the first lookup table includes an integer part of the exponential function and the second lookup table includes a fractional part of the exponential function.

7. The method of claim 5, wherein the at least one lookup table includes fixed-point values of the exponential function.

8. The method of claim 1, further comprising:
   converting factors of the scaling function to fixed-point representations,
   wherein the obtaining the weight of the at least one neighboring picture comprises multiplying the fixed-point representations of the scaling function with the exponential function.

9. The method of claim 1, further comprising:
   performing a per-pixel loop for a plurality of iterations, each iteration of the plurality of iterations includes the obtaining the filtered sample value of the current picture, for a respective pixel from among pixels of the current picture; and converting, based on a factor from among the scaling function or the exponential function not varying for the pixels, to a fixed-point representation before performing the plurality of iterations of the per-pixel loop.

10. The method of claim 1, wherein the at least one first factor of the numerator of the exponent includes motion estimation error of the at least one neighboring picture, the at least one second factor of the denominator of the exponent includes a quantization parameter, the scaling function includes a numerator with at least one third factor and a denominator with at least one fourth factor, the at least one third factor includes a noise level of the current picture, and the at least one fourth factor includes a picture order count distance of the at least one neighboring picture from the current picture.

11. A system comprising:

at least one memory storing computer code; and at least one processor configured to access the computer code and operate as instructed by the computer code, the computer code including:

temporal filter code that is configured to cause the at least one processor to apply a temporal filter to a current picture, the temporal filter code comprising:

exponential function obtaining code that is configured to cause the at least one processor to obtain an exponential function, that includes an exponent with a numerator with at least one first factor and a denominator with at least one second factor, by computing the exponent of the exponential function as fixed-point values or by using at least one lookup table;

weight obtaining code that is configured to cause the at least one processor to obtain a weight of at least one neighboring picture by multiplying a scaling function with the exponential function;

filtered sample value obtaining code that is configured to cause the at least one processor to obtain a filtered sample value of the current picture based on a sample value of the current picture and the weight of the at least one neighboring picture; and sample value replacing code that is configured to cause the at least one processor to replace the sample value of the current picture with the filtered sample value; and encoding code that is configured to cause the at least one processor to encode the current picture after the temporal filter is applied.

12. The system of claim 11, wherein the exponential function obtaining code is configured to cause the at least one processor to compute the exponent of the exponential function as the fixed-point values.

13. The system of claim 12, wherein the exponential function obtaining code is configured to cause the at least one processor to represent the fixed-point values as $2^n$ bits, wherein n is an integer.

14. The system of claim 12, wherein the exponential function obtaining code is configured to cause the at least one processor to scale a floating-point value representation of a factor from among the at least one first factor or the at least one second factor with a scaling factor having a power of 2.

15. The system of claim 11, wherein the exponential function obtaining code is configured to cause the at least one processor to obtain the exponential function by using the at least one lookup table.

16. The system of claim 11, wherein the at least one lookup table comprises a first lookup table and a second lookup table, and the first lookup table includes an integer part of the exponential function and the second lookup table includes a fractional part of the exponential function.

17. The system of claim 15, wherein the at least one lookup table includes fixed-point values of the exponential function.

18. The system of claim 11, wherein the computer code further includes:

converting code configured to cause the at least one processor to convert factors of the scaling function to fixed-point representations, wherein the weight obtaining code is configured to cause the at least one processor to obtain the weight of the at least one neighboring picture by multiplying the fixed-point representations of the scaling function with the exponential function.

19. The system of claim 11, wherein the computer code further includes:

loop code that comprises the filtered sample value obtaining code and that is configured to cause the at least one processor to perform a per-pixel loop for a plurality of iterations, each iteration of the plurality of iterations includes obtaining the filtered sample value of the current picture, for a respective pixel from among pixels of the current picture; and converting code that is configured to cause the at least one processor to convert, based on a factor from among the scaling function or the exponential function not varying for the pixels, to a fixed-point representation before the plurality of iterations of the per-pixel loop are performed.

20. A non-transitory computer-readable medium storing computer code that is configured to, when executed by at least one processor, cause the at least one processor to:

apply a temporal filter to a current picture, by:

obtaining an exponential function, that includes an exponent with a numerator with at least one first factor and a denominator with at least one second factor, by computing the exponent of the exponential function as fixed-point values or by using at least one lookup table;

obtaining a weight of at least one neighboring picture by multiplying a scaling function with the exponential function;

obtaining a filtered sample value of the current picture based on a sample value of the current picture and the weight of the at least one neighboring picture; and replacing the sample value of the current picture with the filtered sample value; and encode the current picture after the temporal filter is applied.

* * * * *